(12) United States Patent
Sanchez

(10) Patent No.: US 10,918,572 B2
(45) Date of Patent: Feb. 16, 2021

(54) PROTECTING SYSTEM FOR CONTAINING A BIOPHARMACEUTICAL FLUID

(71) Applicant: SARTORIUS STEDIM NORTH AMERICA, Bohemia, NY (US)

(72) Inventor: Marc Sanchez, Patchogue, NY (US)

(73) Assignee: SARTORIUS STEDIM NORTH AMERICA, INC., Bohemia, NY (US)

( * ) Notice: Subject to any disclaimer, the term of this patent is extended or adjusted under 35 U.S.C. 154(b) by 570 days.

(21) Appl. No.: 15/796,116

(22) Filed: Oct. 27, 2017

(65) Prior Publication Data

US 2019/0125628 A1 May 2, 2019

(51) Int. Cl.
| | |
|---|---|
| *A61J 1/16* | (2006.01) |
| *F16B 19/10* | (2006.01) |
| *A44B 17/00* | (2006.01) |
| *F16B 5/06* | (2006.01) |
| *B65D 77/06* | (2006.01) |
| *F16B 21/06* | (2006.01) |
| *A61J 1/10* | (2006.01) |
| *B65D 81/02* | (2006.01) |
| *F16B 43/00* | (2006.01) |
| *A61J 1/14* | (2006.01) |

(Continued)

(52) U.S. Cl.
CPC ............. *A61J 1/16* (2013.01); *A44B 17/0041* (2013.01); *A61J 1/10* (2013.01); *B65D 77/06* (2013.01); *B65D 81/025* (2013.01); *F16B 5/0642* (2013.01); *F16B 19/1081* (2013.01); *F16B 21/065* (2013.01); *A61J 1/1425* (2015.05); *F16B 19/008* (2013.01); *F16B 21/086* (2013.01); *F16B 43/001* (2013.01)

(58) Field of Classification Search
CPC ... A61J 1/10; A61J 1/1425; A61J 1/16; A44B 17/0041; B65D 77/06; B65D 81/025; F16B 19/1081; F16B 2019/006; F16B 19/08; F16B 19/10; F16B 21/08; F16B 5/0642; F16B 19/008; F16B 19/1082; F16B 21/065; F16B 21/086; F16B 43/001; F16B 5/0607; F16B 5/065; Y10T 29/49954
See application file for complete search history.

(56) References Cited

U.S. PATENT DOCUMENTS 3,213,507 A * 10/1965 Christian ................ F16B 5/065
24/662
4,469,227 A * 9/1984 Faust ....................... A01N 1/02
206/526

(Continued)

FOREIGN PATENT DOCUMENTS

EP 2 322 442 A1 5/2011

*Primary Examiner* — Benjamin J Klein
(74) *Attorney, Agent, or Firm* — Nixon & Vanderhye

(57) ABSTRACT

A protecting system for containing a biopharmaceutical fluid includes: a flexible pouch designed to contain a biopharmaceutical fluid; a protecting package including: two frames which respectively form a lower frame and an upper frame and which have a peripheral area; a fastening system able to clamp the two frames of the protecting package to each other, the frames sandwiching the flexible pouch. The fastening system includes at least an assembly only including: a snap including a backing part; and a cap including a washer. The lower and the upper frames of the protecting package are directly clamped between the washer of the cap and the backing part of the snap in a clamping position.

17 Claims, 8 Drawing Sheets

(51) Int. Cl.
  *F16B 21/08* (2006.01)
  *F16B 19/00* (2006.01)

(56) References Cited

U.S. PATENT DOCUMENTS

| | | | | |
|---|---|---|---|---|
| 4,898,301 A * | 2/1990 | Schick | ............... | B65D 75/5877 |
| | | | | 229/117.26 |
| 4,920,618 A * | 5/1990 | Iguchi | ..................... | F16B 5/065 |
| | | | | 24/297 |
| 4,927,287 A * | 5/1990 | Ohkawa | ............... | F16B 21/086 |
| | | | | 24/297 |
| 5,636,760 A * | 6/1997 | Yamamoto | ............. | B65D 77/06 |
| | | | | 220/723 |
| 5,775,860 A * | 7/1998 | Meyer | ................ | F16B 19/1081 |
| | | | | 411/41 |
| 6,526,634 B1 * | 3/2003 | Hsieh | ..................... | F16B 5/065 |
| | | | | 174/16.3 |
| 8,028,532 B2 * | 10/2011 | Voute | ..................... | A61J 1/165 |
| | | | | 62/66 |
| 8,177,123 B2 * | 5/2012 | Voute | ................... | A01N 1/0263 |
| | | | | 206/505 |
| 9,161,527 B2 * | 10/2015 | Cutting | .................... | A01N 1/02 |
| 10,309,863 B2 * | 6/2019 | Sanchez | ............. | G01M 3/3272 |
| 2007/0215501 A1 * | 9/2007 | Hanson | ................ | B65D 81/02 |
| | | | | 206/320 |

* cited by examiner

PROTECTING SYSTEM FOR CONTAINING A BIOPHARMACEUTICAL FLUID

BACKGROUND OF THE INVENTION

Field of the Invention

The invention relates to the protection of flexible pouches specially designed to contain a biopharmaceutical fluid, and more broadly to a system for containing a biopharmaceutical fluid. A biopharmaceutical fluid means a biotechnological derived fluid, for example a fluid derived from a culture medium, a cell culture, a buffer solution, an artificial nutrition liquid, a blood fraction, a blood derived component or a pharmaceutical fluid or, more broadly, a fluid specifically designed to be used in the medical field.

Description of the Related Art

It is known to use a flexible pouch to contain the biopharmaceutical fluid. The flexible pouch is able to withstand low mechanical stress without damage. Moreover the flexible pouch is advantageous since it can be folded or stored flat when there is no biopharmaceutical fluid inside. Hence, the flexible pouch occupies a small volume.

The flexible pouch is generally designed for a single use and to contain a biopharmaceutical fluid volume which is between 1 liter and 500 liters.

However, specifically for shipping of the flexible pouch filled with fluid, for example, between several plant areas or from the provider of the fluid to its client which will use it, but also for storage, the flexible pouch must be protected, although the leakage risk is small.

The document EP-2 322 442 discloses a container for a flexible pouch. The container comprises a lower part and an upper part which are rigid and joined along a common edge and which form a single piece container. The lower part and the upper part may be secured to each other by different means, such as screws.

However, the use of screws broadly increases the number of pieces needed to fasten the parts of the container to each other. Thus, the number of operations to assemble the fastening system to fasten the parts of the container is time consuming.

Document EP-2 322 442 also discloses the use of other means to secure the lower and the upper parts of the container. In particular, it discloses a push/pull plastic captive fastener commercially available as McMaster-Carr Part No. #93040A103. The captive fastener comprises two pieces forming a plunger and a grommet. The fastening is made by pressing the grommet into a hole, for example into the holes of the upper and lower part of the container, and then pressing the plunger into the grommet.

However, the upper and lower parts of the container would be maintained to each other only by the grommet. The surface of retention between the captive fastener and the container is very small, which renders the captive fastener unsecured.

Document EP-2 322 442 also discloses a NYLON reusable snap-lock rivet commercially available as McMaster-Carr Part No. #91020A220. The rivet is made of only one piece. The surface of retention between the parts of the container and the rivet is almost inexistent, which also renders the fastening system unsecured.

Finally, Document EP-2 322 442 discloses a DELRIN blind rivet commercially available as McMaster-Carr Part No. #90219A325. This rivet is made of one piece. A tool is required to install the rivet, which is time consuming.

SUMMARY OF THE INVENTION

The present invention aims to improve the present situation.

For this purpose it proposes a protecting system for containing a biopharmaceutical fluid, comprising:
  a flexible pouch designed to contain a biopharmaceutical fluid,
  a protecting package comprising:
    two frames which respectively form a lower frame and an upper frame and which have a peripheral area;
  a fastening system able to clamp the two frames of the protecting package to each other, the frames sandwiching the flexible pouch, characterized in that the fastening system comprises at least an assembly only comprising:
    a snap comprising a backing part, and
    a cap comprising a washer,
the lower and the upper frames of the protecting package being directly clamped between the washer of the cap and the backing part of the snap in clamping position.

It has been found that the use of only two pieces as an assembly of a fastening system reduces the time needed to fasten the protecting package. Moreover, the surface of retention between the assembly of the fastening system and the frames is large.

In another aspect, at least a peripheral side of the upper and lower frames of the protecting package comprises through holes facing each other, through which the fastening system is arranged.

In another aspect, the snap also comprises at least two shaft parts extending from a backing part according to a longitudinal direction of the snap, and wherein the cap also comprises a captive locker, wherein the captive locker is locked between the shaft parts of the snap in clamping position.

In another aspect, the protecting system also comprises a protecting body comprising two plates which respectively form a lower surface and an upper surface, the two plates being able to sandwich the flexible pouch for constraining the flexible pouch, the two plates being clamped between the two frames of the protecting package in clamping position.

In another aspect, at least a peripheral side of the lower and upper plates of the protecting body comprises through holes facing the through holes of the protecting package, the fastening system being arranged through the through holes of the protecting body and the protecting package.

Then, the fastening system can be used in the case where only the protecting package comprises holes in which the fastening system can be arranged. Alternatively, the fastening system can be use in the case where both of the protecting package and the protecting body comprise though holes facing each other, through which the fastening system can be arranged.

In another aspect, the shaft parts of the snap are able to be inserted in the through holes.

In another aspect, the fastening system is able to pass from an engagement position, wherein the shaft parts are inserted in the washer, the upper and lower frames of the protecting package being not clamp to each other, to a clamping position, wherein the captive locker is locked between the shaft parts such that the upper and the lower frames of the protecting package are clamped to each other.

Then, the time needed to fasten the frames of the protecting package (or the frames of the protecting package and the plates of the protecting body) to each other is reduced, since after the insertion of the shaft parts through the through holes, the captive locker is ready to be directly inserted between the shaft parts. There is no need of a complementary operation.

In another aspect, an inner surface of each shaft part of the snap comprises a recess able to retain a protrusion portion of the captive locker in clamping position.

The recess and the protrusion can maintain the fastening system locked. The use of this particular arrangement also reduces the manufacturing costs. Indeed, only two molds are needed to manufacture the fastening system.

In another aspect, an end of the shaft parts comprises an extending portion, the extending portion being sized such that, after the insertion of the shaft parts into the washer of the cap, the shaft parts are prevented from being removed from the washer of the cap.

The surface of retention between the snap and the cap is increased. The rigidity of the fastening system increases with the surface of retention between the snap and the cap.

In another aspect, the captive locker is sized such that in clamping position, the captive locker is able to push the shaft parts of the snap away from a longitudinal axis of the snap, such that the extending portions of the shaft parts are able to maintain the washer directly against one of the plate of the protecting body.

Then, the slosh of the biopharmaceutical fluid in the pouch is prevented.

In another aspect, the shaft parts of the snap are made in a rigid elastic material such as Acrylonitrile Butadiene Styrene, Polycarbonate, Polyvinylidene fluoride, Polysulfone and Polyurethane.

The material is chosen such that the shaft parts are stiff and elastic enough to come back to their initial position after their insertion through the washer of the cap.

In another aspect, the cap also comprises two belts connecting respectively an edge of the washer to a top of the captive locker and an opposite edge of the washer to the top of the captive locker, the belt being made of a flexible material.

The belts allow to manufacture a fastening system comprises only two pieces, since the captive locker is attached to the washer.

In another aspect, a longitudinal axis of the snap is substantially perpendicular to a main plane of the protecting package.

BRIEF DESCRIPTION OF THE DRAWINGS

Other features and advantages of the invention will be apparent from reading the following detailed description of example embodiments and from examining the attached drawings, in which.

DESCRIPTION OF THE PREFERRED EMBODIMENTS

Below is a detailed description of several embodiments of the invention, with examples and with references to the drawings.

Figure 1:
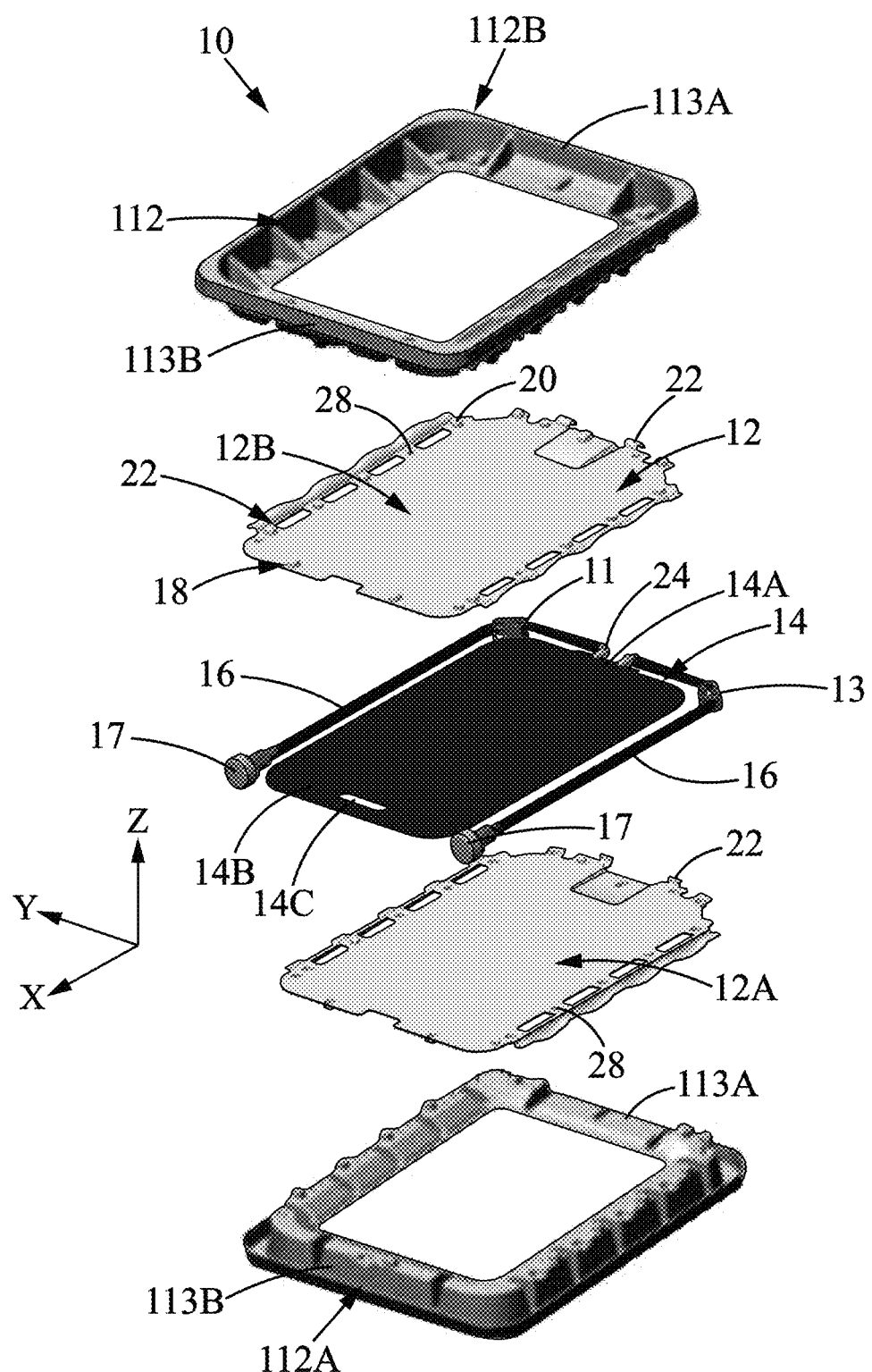
FIG. 1 shows a perspective view of a protecting system for containing a biopharmaceutical fluid which comprises a protecting body and a protecting package which are disassembled according to the invention.

FIG. 1 shows a protecting system 10 for containing a biopharmaceutical fluid according to the invention.

The protecting system 10 comprises a protecting package 112 comprising two frames 112A, 112B, a protecting body 12 comprising two plates 12A, 12B, a flexible pouch 14 and at least one hose 16 connected to the flexible pouch 14.

Figure 2:
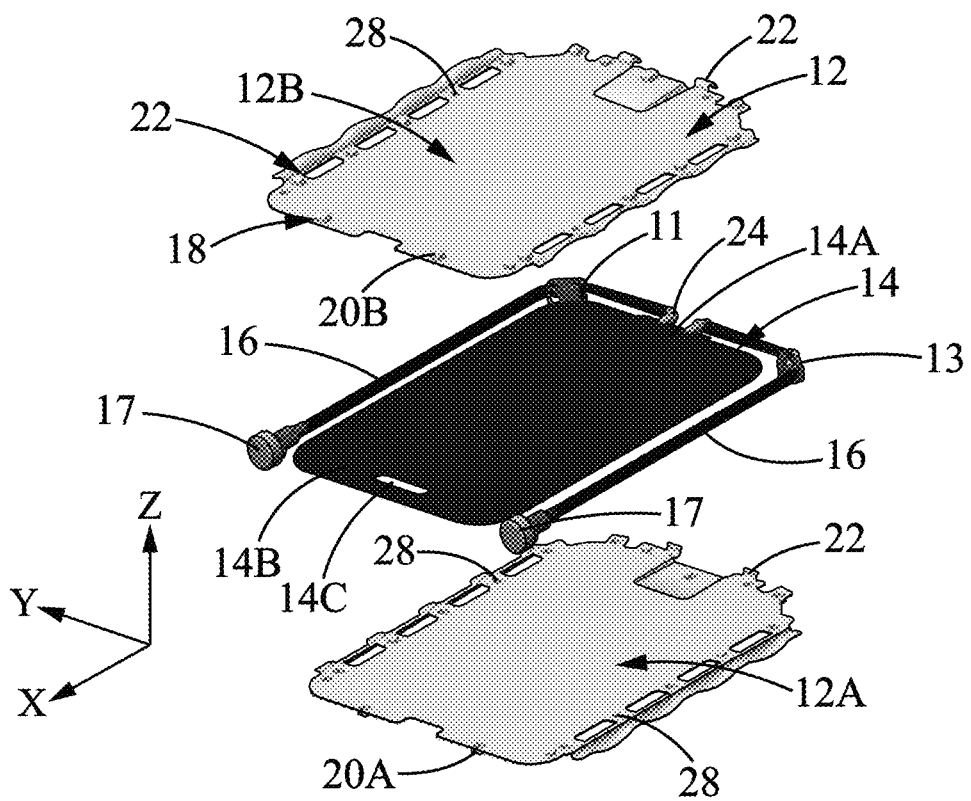
FIG. 2 shows a protecting body according to one embodiment of the invention which is disassembled.
Figure 3:
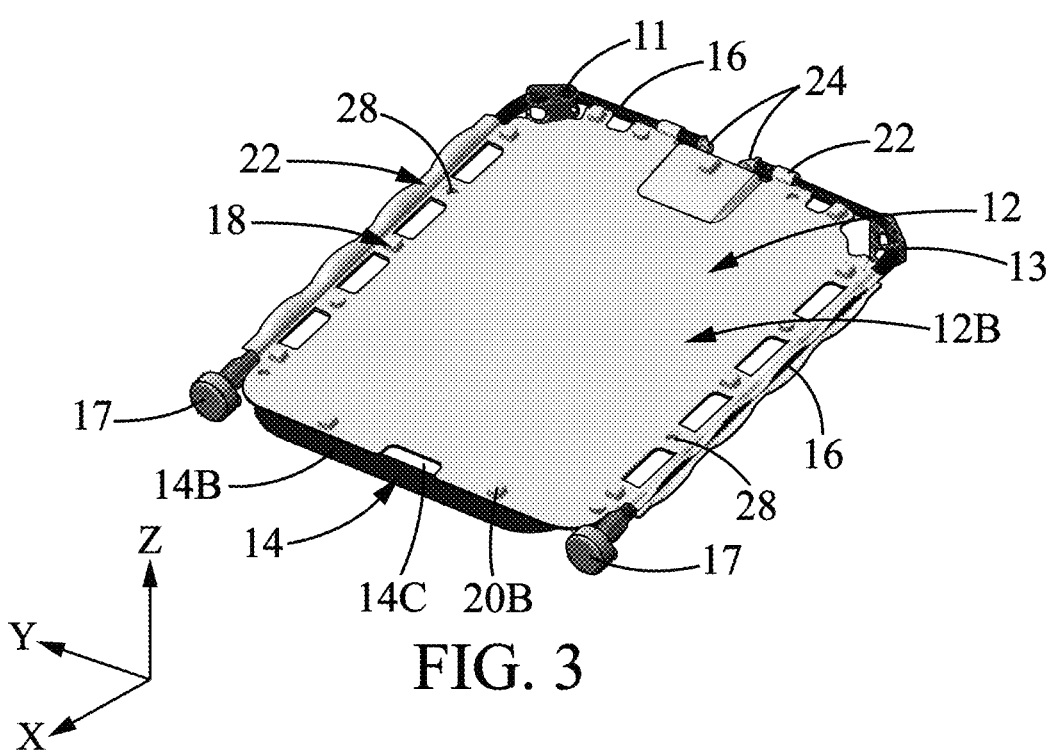
FIG. 3 shows a protecting body according to one embodiment of the invention which is assembled.
Figure 4:
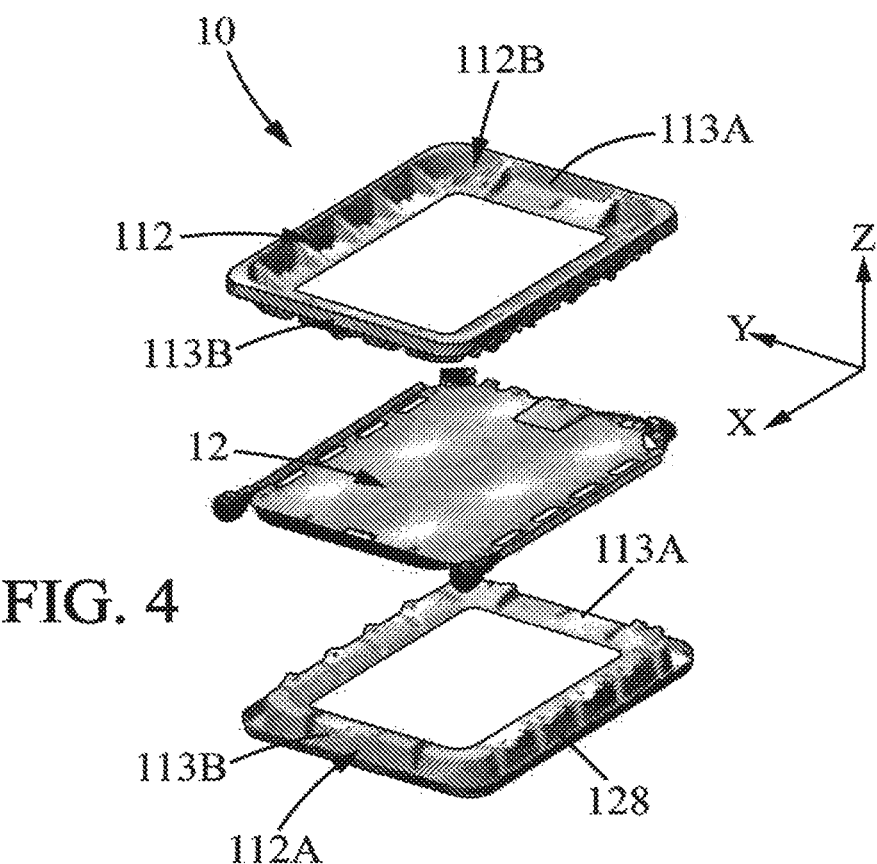
FIG. 4 shows the protecting system according to one embodiment of the invention in which the protecting body is assembled and the protecting package is disassembled.

With reference to FIGS. 1 to 3, the system 10 comprises a protecting body 12, a flexible pouch 14 and at least one hose 16 connected to the flexible pouch 14. The protecting body 12 and the flexible pouch 14 comprise a longitudinal direction X and a transversal direction Y. The protecting body 12 and the flexible pouch 14 comprise longitudinal and transversal sides.

The flexible pouch 14 is substantially planar, has a substantially rectangular shape, and extends in a main plane XY which is, here, the horizontal plane. The flexible pouch 14 is specifically designed to be able to contain up to 100 liters of biopharmaceutical fluid. However, the flexible pouch 14 can have a maximum volume capacity which is different, for example of 5 liters, 10 liters, 20 liters or 50 liters. The two hoses 16 are connected to a front longitudinal edge 14A of the flexible pouch 14. An opposite longitudinal edge of the flexible pouch 14 to the front longitudinal edge 14A is a rear longitudinal edge 14B.

As illustrated FIGS. 1 to 3, the flexible pouch 14 comprises a through hole 14C which can form a handle for the flexible pouch 14. Mainly, the through hole 14C makes it possible to attach two other protecting bodies to each other such that each protecting body covers the external surface of one of the two plates 12A, 12B. Indeed, the through hole 14C provides a free space wherein an attachment means can be arranged to attach the protecting bodies to each other.

Hence, the system is reinforced, which is especially relevant regarding shipping for example.

The protecting body 12 comprises two substantially planar plates 12A, 12B. The planar plates 12A, 12B extend also in a plane parallel to the main plane XY. The plate 12A forms a lower surface and the plate 12B forms an upper surface, with respect to the vertical axis Z.

The two hoses 16 are connected to the flexible pouch 14 on the front longitudinal side of the protecting body 12, each extends along one transversal side of the protecting body 12, and each comprises a connector 17. The connectors 17 make it possible to fluidly connect the flexible pouch 14 to another element, for example a tank. The longitudinal rear side of the protecting body 12 extends between the two connectors 17.

As can be seen on FIG. 3, when the two plates 12A, 12B are fixed to each other, they sandwich the flexible pouch 14. The planar plate 12A, which forms the lower surface of the protecting body 12, presses the lower surface of the flexible pouch 14, with respect to the vertical axis Z. Similarly, the planar plate 12B, which forms the upper surface of the protecting body 12, presses the upper surface of the flexible pouch 14, with respect to the vertical axis Z. The two plates 12A, 12B have planar dimensions which are substantially identical to the ones of the flexible pouch 14.

The system 10 comprises two clamps 11, 13. Each clamp 11, 13 is located near to one corner between the front longitudinal edge 14A of the flexible pouch 14 and one transversal edge. Each clamp 11, 13 respectively pinches one hose 16 at a straight angle. Thus, each plate 12A, 12B comprises a cut-out located at each corner between its front longitudinal edge and one transversal edge. These cut-outs create a free space that can be occupied by the clamps 11, 13.

Thus, each of the two plates 12A, 12B has a substantially rectangular shape with two cut-outs respectively on one corner.

As shown more particularly on FIG. 3, the rear longitudinal edge 14B and a portion of the through hole 14C are not sandwiched by the two plates 12A, 12B. This part of the flexible pouch 14 is flat and does not comprise biopharmaceutical fluid. Indeed, the rear longitudinal edge 14B comprises two films which are welded one to each other. Hence, the biopharmaceutical fluid in a part of the flexible pouch 14 which is protected by the two plates 12A, 12B.

The two plates 12A, 12B are more rigid than the flexible pouch 14. Consequently, when the two plates 12A, 12B sandwich the flexible pouch 14, they constrain the flexible pouch 14. Thus the protecting body 12 and the flexible pouch 14 are substantially planar.

The two plates 12A, 12B sandwich the flexible pouch 14 with respect to the main plane XY, but the protecting body 12 comprises, on a peripheral side, at least one opening for accessing the flexible pouch 14. More broadly, the protecting body comprises at least one opening on the peripheral side. The opening is able to receive at least one port 24 mounted to one hose 16 to fluidly connect the interior and the exterior of the flexible pouch 14.

The two plates 12A, 12B are identical and symmetrically face each other, with respect to the main plane XY. Moreover, they are removably fixed to each other by an attachment system 18 that can be specifically seen FIGS. 2 and 3.

Alternatively, the attachment system 18 is a non-removable system, which means that, once the two plates 12A, 12B are fixed to each other, it is not possible anymore to detach the two plates 12A, 12B one from each other.

The attachment system 18 may comprise a plurality of snap buttons 20. One of the two plates 12A, 12B comprises a first element 20A of one snap button 20 and the other plate comprises a second complementary element 20B of one snap button 20. The second element 20B engages the first element 20A in a direction parallel to the vertical axis Z.

In this embodiment, the protecting body 12 comprises snap buttons 20 on transversal and longitudinal sides. The snap buttons 20 are symmetrically arranged on the transversal sides of the two plates 12A, 12B. Indeed, the protecting body 12 comprises for example four snap buttons 20 on each transversal side. The protecting body 12 may comprise more snap buttons 20 on the front longitudinal side 14A that in the rear longitudinal side 14B.

Furthermore, the protecting body 12 comprises an assembly 22 for holding the two hoses 16. The two plates 12A, 12B comprise, on their peripheral sides, complementary parts which form the assembly 22 for holding the hoses 16.

Each one of the hoses 16 is connected to the front longitudinal side 14A of the flexible pouch 14 by means of a port 24. For example, one port 24 forms an inlet for the flexible pouch 14 and the other port 24 forms an outlet of the flexible pouch 14. The assembly 22 for holding the two hoses 16 is symmetrically arranged with respect to the longitudinal direction X. Each symmetrical part is able to hold one hose 16.

The two plates 12A, 12B are rigid enough to constrain the shape of the flexible pouch 14 such that the system 10 for containing the biopharmaceutical fluid occupies a minimum volume. This is particularly advantageous for storage and shipping. When a flexible pouch 14 is stored, the biopharmaceutical fluid can be frozen or thawed. When the flexible pouch is shipped, most often, the biopharmaceutical fluid is thawed even if the biopharmaceutical fluid can as well be frozen.

However, the two plates 12A, 12B are also flexible enough to allow the protecting body 12 to have a thickness in a central area greater than in a circumferential area. The latter comprises the longitudinal and transversal sides. Thus, when the biopharmaceutical fluid is frozen, the central area of the flexible pouch is slightly curved. Hence, a dimension on the longitudinal direction X of the protecting body 12 slightly decreases. In this case, the biopharmaceutical fluid slightly constrains the two plates 12A, 12B.

The two plates 12A, 12B may also comprise through holes 28, regularly arranged on the peripheral sides of the two plates 12A, 12B. The through holes 28 are provided such that a fastening system 200 may attach the two plates 12A, 12B to each other, as explained below.

With reference to FIGS. 1 and 4 to 7, the protecting system 10 for containing the biopharmaceutical fluid also comprises a protecting package 112. The protecting package 112 comprises two frames 112A, 112B. The two frames 112A, 112B are identical and symmetrically face each other.

The frame 112A forms a lower frame and the frame 112B forms an upper frame with respect to a vertical axis Z. Each frame 112A, 112B has a main plane XY which is also the main plane of the protecting body 12. The two frames 112A, 112B have a longitudinal direction X and a transversal direction Y which are the same as the ones of the protecting body 12. The two frames 112A, 112B also have a longitudinal front side 113A, and longitudinal rear side 113B and two transversal sides which link the longitudinal front side 113A and the longitudinal rear side 113B.

The two frames 112A, 112B have a peripheral area, with respect to the main plane XY. The peripheral area of each frame 112A, 112B delineates an opening on a central area.

Figure 5:
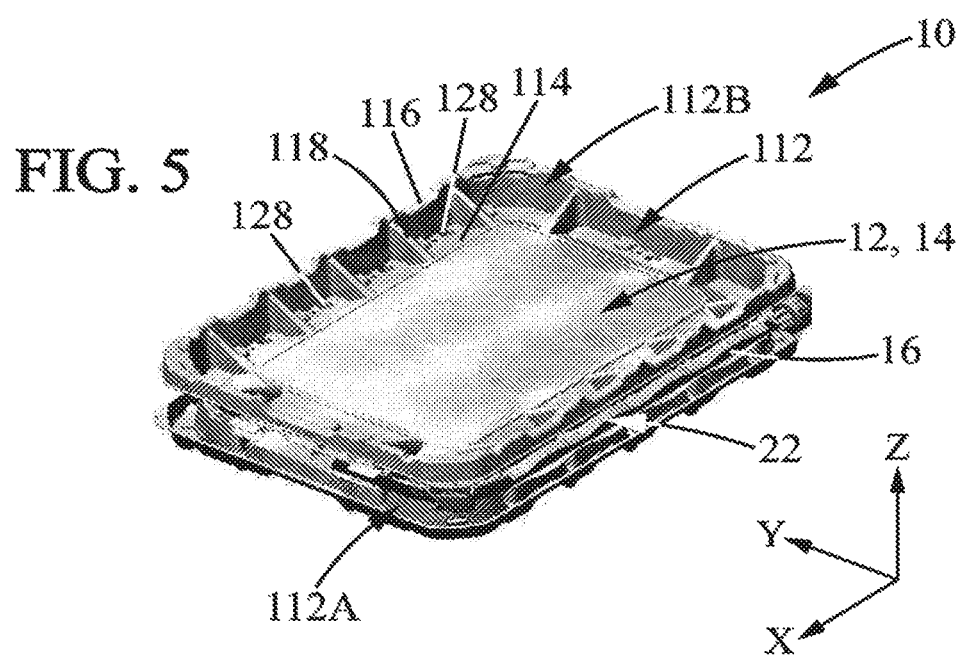
FIG. 5 shows an assembled protecting system according to one embodiment of the invention.

Moreover, each frame 112A, 112B have a peripheral inner edge 114 and a peripheral outer edge 116, with respect to the opening, as can be seen on FIG. 5. The peripheral inner 114 and outer 116 edges do not belong to a same plane parallel to the main plane XY. Between these peripheral inner 114 and outer 116 edges, each frame 112A, 112B comprises a plurality of structural reinforcement bodies 118 which link the two edges and which are regularly arranged on longitudinal and transversal sides of an external surface, with respect to the flexible pouch 14, of each frame 112A, 112B. These structural reinforcement bodies 118 can be seen on the frame 112B on FIG. 5. The inner peripheral edge 114 of each frame 112A, 112B is regular whereas the outer peripheral edge 116 of each frame 112A, 112B is corrugated. This increases the mechanical resilience of the two frames 112A, 112B when the two frames 112A, 112B are fixed to each other.

The two frames 112A, 112B are fixed to each other such that they respectively surround the two plates 12A, 12B, which sandwich the flexible pouch 14, as illustrated on FIG. 5. The upper frame 112B surrounds the plate 12B which forms the upper surface of the protecting body 12. The lower frame 112A surrounds the plate 12A which forms the lower surface of the protecting body 12. Since the two frames 112A, 112B have a central opening, they surround the peripheral area of the two plates 12A, 12B and not the central area of these two plates 12A, 12B. Hence, the two frames 112A, 112B essentially protect the peripheral area of the protecting body 12 and the flexible pouch 14. The two frames 112A, 112B also cover the assembly 22 for holding the hoses 16 which are protected.

Figure 6:
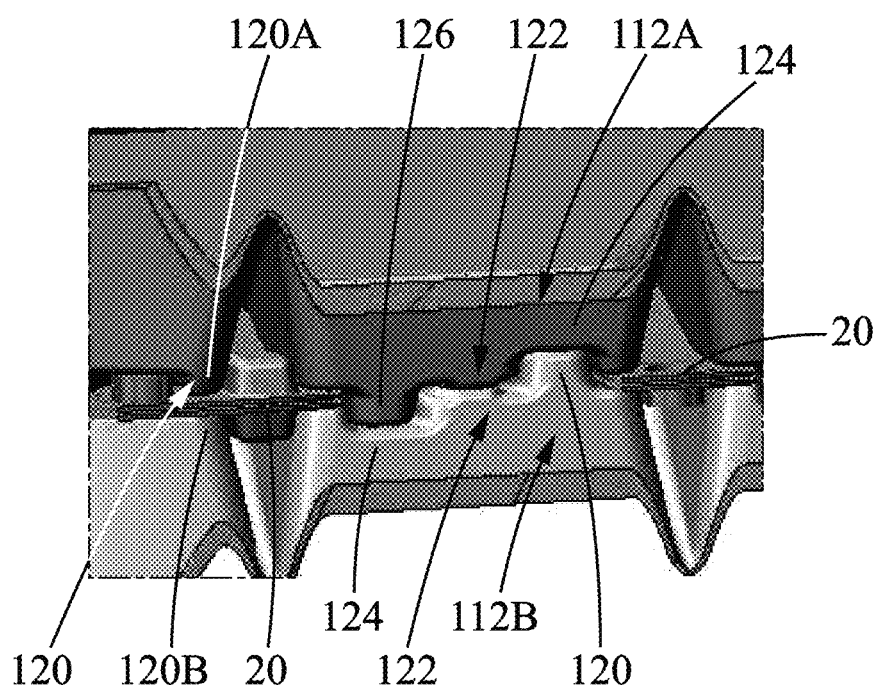
FIG. 6 shows a perspective view of a part of the protecting package which is assembled.
Figure 7:
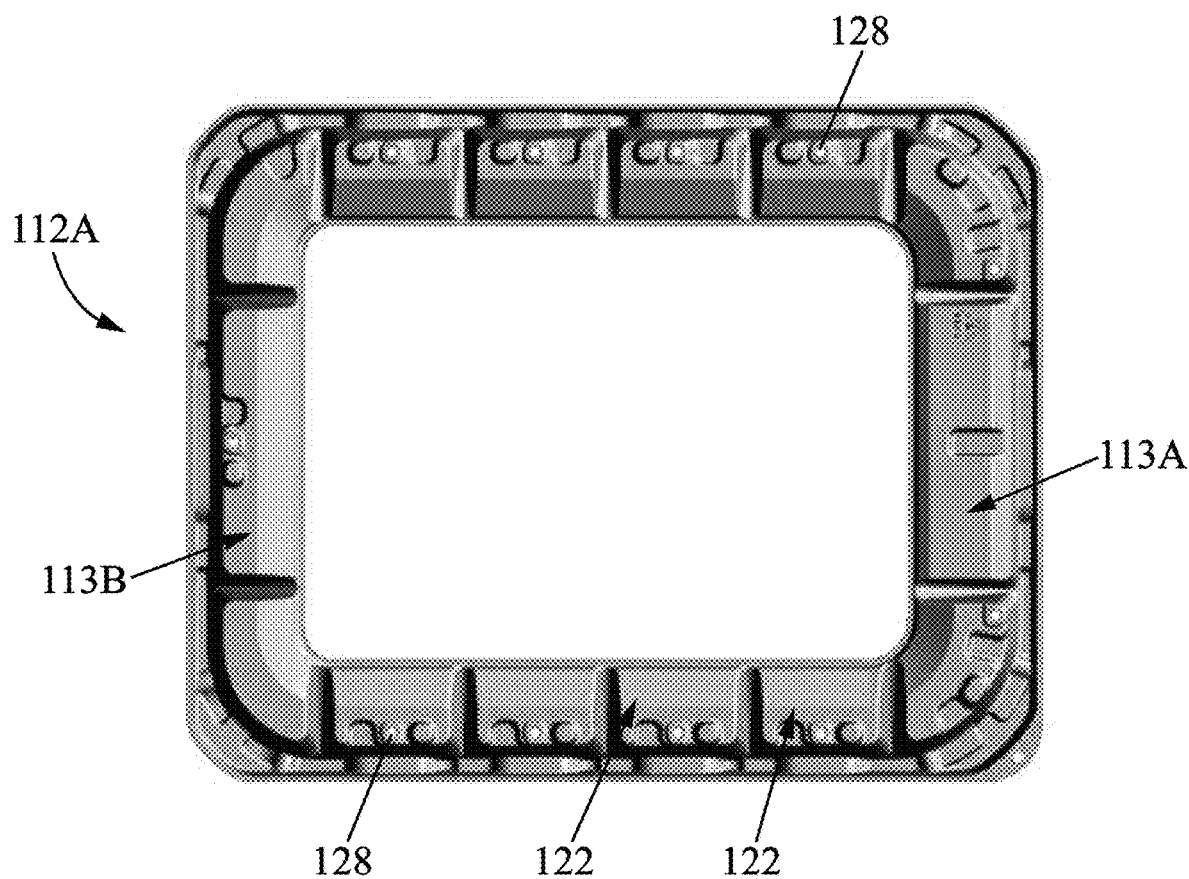
FIG. 7 shows a view from above of a frame of the protecting package according to one embodiment of the invention.

As illustrated FIG. 6, the protecting package 112 comprises at least an assembly 120 for pinching at least a portion of the two plates 12A, 12B. The assembly 120 comprises two complementary bodies 120A, 120B respectively carried by the two frames 112A, 112B. When the two frames 112A, 112B are fixed to each other, they are close enough to pinch a portion of the protecting body 12.

Furthermore, the internal surface, with respect to the flexible pouch 14, of each frame 112A, 112B comprises a plurality of bodies 122 regularly arranged along the transversal sides of the two frames 112A, 112B. The regular bodies are complementary to the assembly 22 for holding the hoses. Hence, when the protecting body 12 is surrounded by the two frames 112A, 112B, there is no free space between the assembly 22 for holding the hoses 16 and the other part of the plates 12A, 12B, as seen on FIG. 5.

Moreover, as can be seen on FIG. 6, each body 122 of the lower frame 112A comprises a recess 124 and a protrusion 126 on an upper surface, with respect to the vertical axis Z. These recesses 124 and protrusions 126 are complementary to the ones carried by identical bodies of the upper frame 112B. These assemblies allow the two frames 112A, 112B being positioned one to each other.

As illustrated FIG. 5, the two frames 112A, 112B may also comprise through holes 128, regularly arranged on the peripheral sides of the two frames 112A, 112B. The through holes 128 are provided such that a fastening system may attach the two frames 112A, 112B to each other, as explained below. The through holes 128 are arranged to face the through holes 28 of the two plates 12A, 12B. The fastening system is thus able, through the holes 28, 128 to attach both the two plates 12A, 12B and the two frames 112A, 112B to each other.

Further, the protecting system 10 comprises a fastening system 200, more particularly illustrated on FIGS. 8 to 13, for attaching the two plates 12A, 12B of the protecting body 12 to the two frames 112A, 112B of the protecting package 112.

The fastening system 200 is not in one piece with any of the two frames 112A, 112B or the two plates 12A, 12B.

The fastening system 200 comprises at least one assembly 202 of two complementary bodies. As illustrated on FIG. 9, the assembly 202 can comprise a first complementary body which is a snap 210 comprising a backing part 212 and an elastic element. The elastic element extends transversally to the backing part 212 according to a longitudinal axis of the snap 210. The elastic element comprises for example at least two shaft parts 214, each extending transversally to the backing part 212 according to a longitudinal axis of the snap 210.

As a variant, the elastic element may also comprise only a single shaft part 214, or more than two shaft parts 214.

An end portion of the shaft parts 214 of the snap 210 may comprise an extending portion 214A extending transversally and away from a longitudinal axis of the snap 210.

The shaft parts 214 are made in an elastic and substantially rigid material. For example, the shaft parts 214 are made in Acrylonitrile Butadiene Styrene, Polycarbonate, Polyvinylidene fluoride, Polysulfone and Polyurethane.

The second complementary body of the fastening system 200 is a cap 220. The cap 220 comprises a circular washer 222 defining a central opening 228. Although the washer 222 is circular in this embodiment, the washer 222 could be of any shape, including square or rectangular shape.

The cap 220 also comprises a captive locker 224, which is linked to the washer 222. For example, the captive locker 224 is linked to the washer 222 by means of two belts 226 connecting respectively an edge of the washer 222 and an opposite edge of the washer 222 to a top of the captive locker 224. The belts 226 are made with a flexible material, allowing a displacement of the captive locker 224 at least according to a longitudinal direction of the cap 220.

The captive locker 224 presents a cylindrical body extending according to a longitudinal direction of the cap 220. The captive locker 224 comprises a protrusion portion 224A extending transversally to the longitudinal direction of the cap 220, on a part of the longitudinal length, and along all the perimeter of the captive locker 224.

Figure 10:
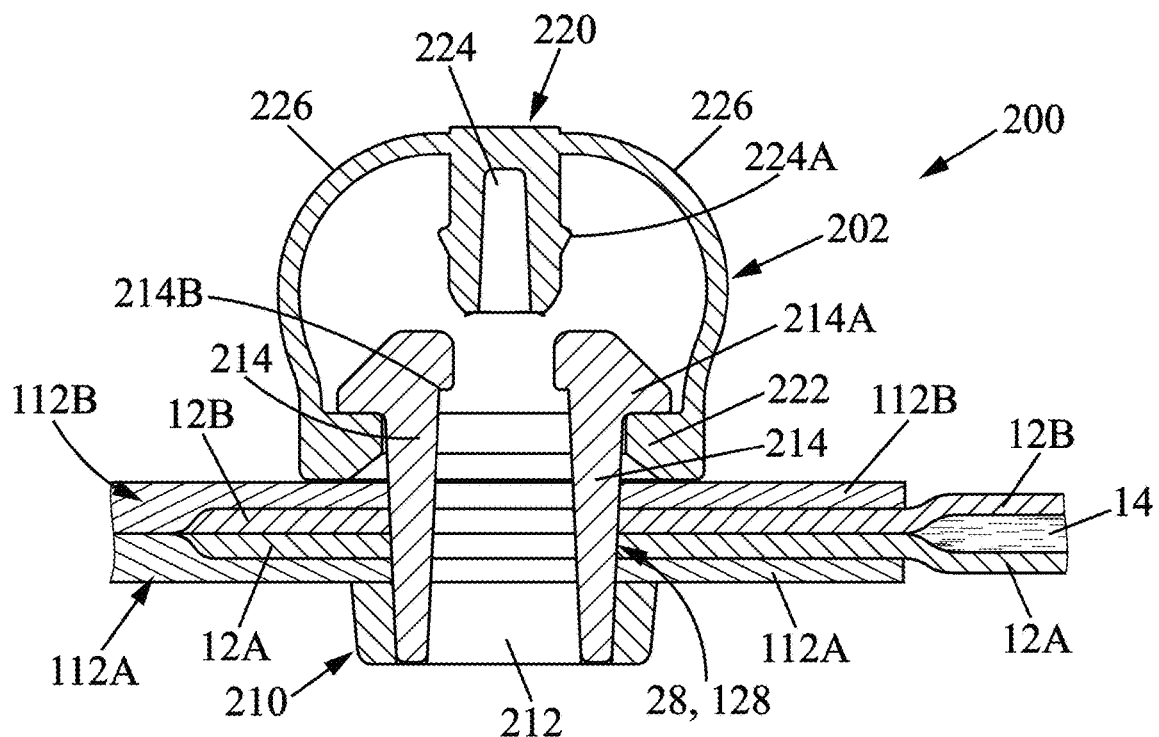
FIG. 10 shows a detailed transversal view of an assembly of the fastening system in engagement position according to an embodiment of the invention.

In an engagement position, illustrated on FIG. 10, the shaft parts 214 are able to be inserted in the central opening 228 of the washer 222. During the insertion of the shaft parts 214 in the central opening 228 of the washer 222, the shaft parts 214 deform to allow the extending portions 214A to pass trough the opening 228. After the insertion, the shaft parts 214 move back to their initial position. The extending portions 214A thus make a surface of retention cooperating with the washer 222. The size of the extending portions 214A prevents the shaft parts 214 to be removed from the washer 222 after their insertion through the washer 222.

In the engagement position, the size of the belts 226 allows the captive locker 224 to be sufficiently remote, with respect to an insertion end of the shaft parts 214, to allow the shaft parts 214 to return toward their initial position after their insertion through the washing 222 of the cap 220.

Figure 11:
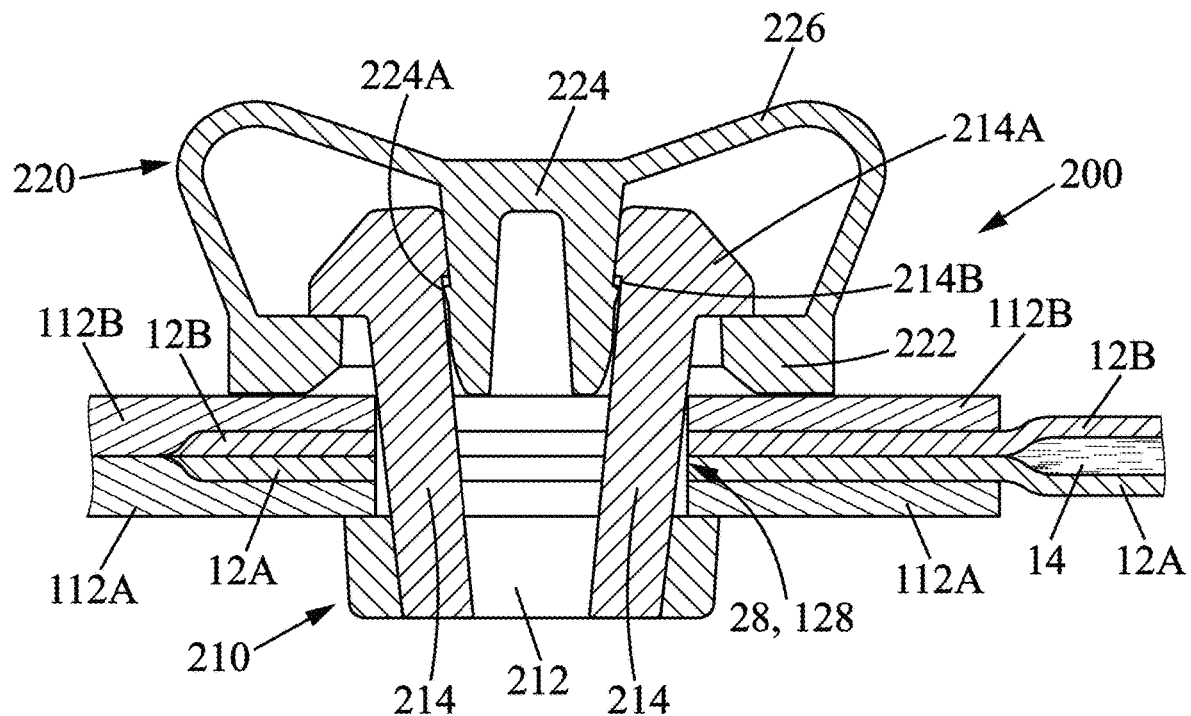
FIG. 11 shows a detailed transversal view of an assembly of the fastening system in clamping position according to the embodiment represented on FIG. 10.
Figure 12:
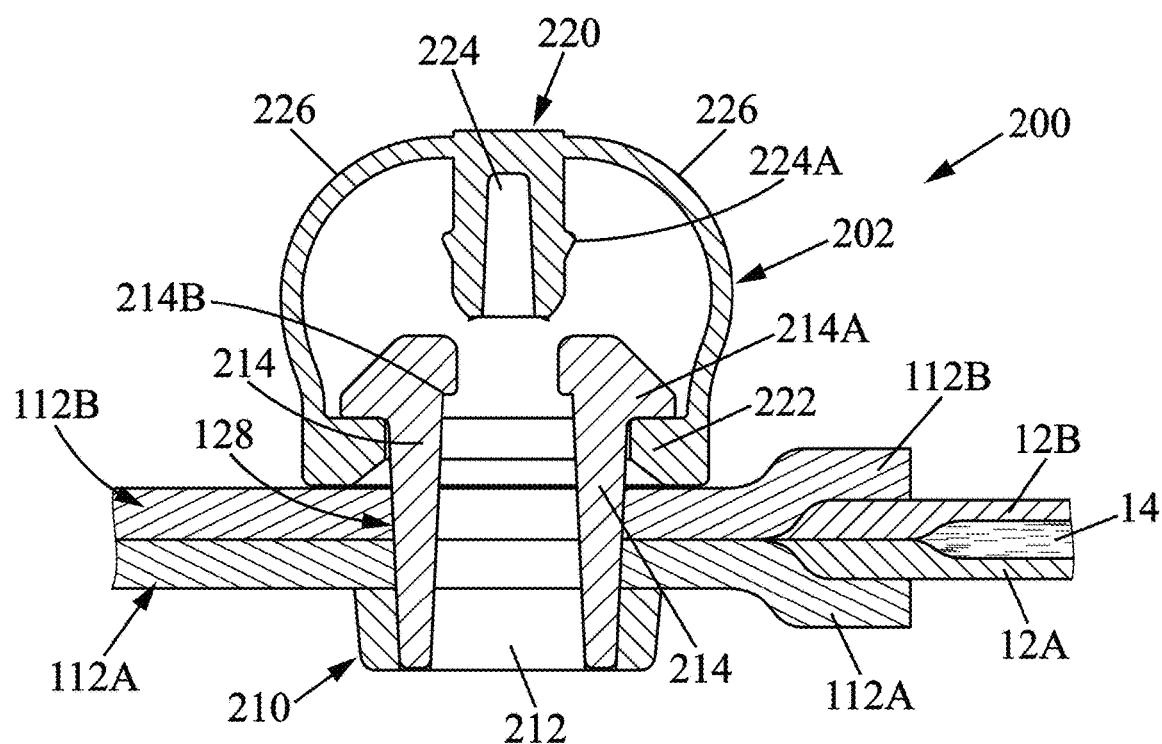
FIG. 12 shows a detailed transversal view of an assembly of the fastening system in engagement position according to another embodiment of the invention.
Figure 13:
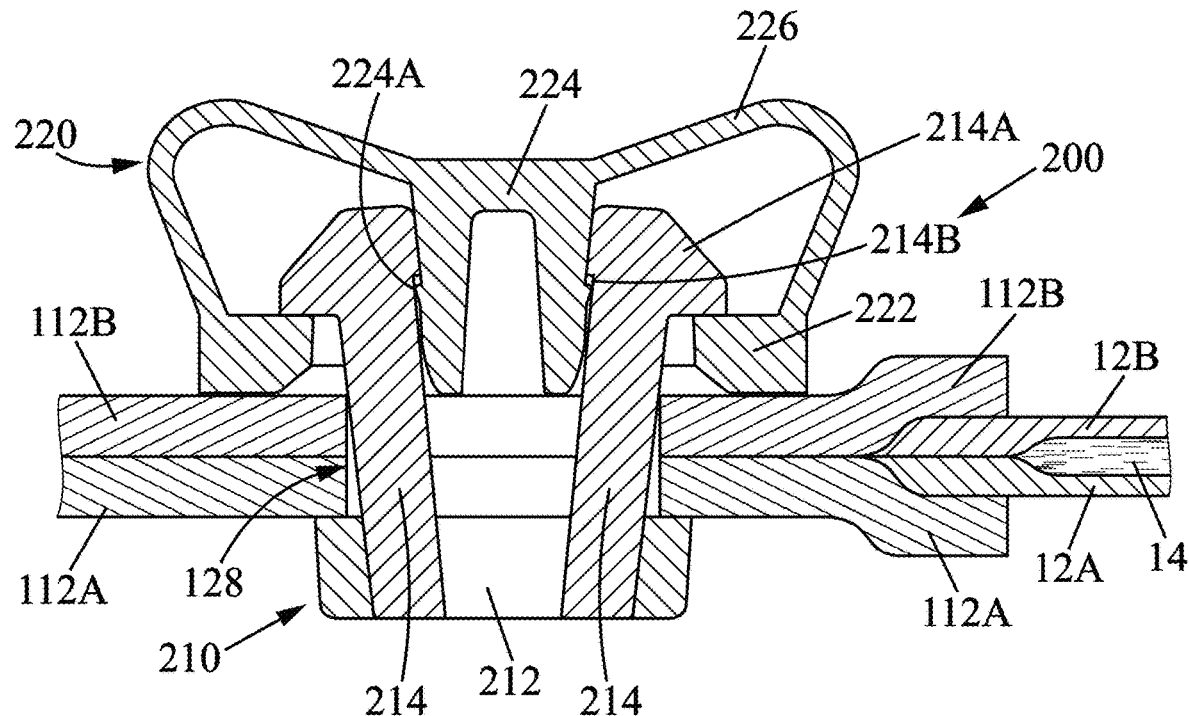
FIG. 13 shows a detailed transversal view of an assembly of the fastening system in clamping position according to the embodiment represented on FIG. 12.

The fastening system 200 is then able to pass from the engagement position, described above, to a clamping position, illustrated on FIG. 11. In the clamping position, the captive locker 224 is pushed between the shaft parts 214 of the snap 210. The captive locker 224 is maintained between the two shaft parts 214 by a recess 214B, comprised on an inner surface of the shaft parts 214, cooperating with the protrusion portion 224A of the captive locker 224. This particular arrangement ensures the positioning of the fastening system 200 in clamping position in all circumstances, for example during vibrations, choc. It also ensures that the cap does not pop up under pressure.

The captive locker 224 also prevents the shaft parts 214 from bending toward the longitudinal axis of the snap 210, where the shaft parts 214 have no more surface of retention with the washer 222.

In clamping position, the fastening system 200 may be non-removable.

Figure 8:
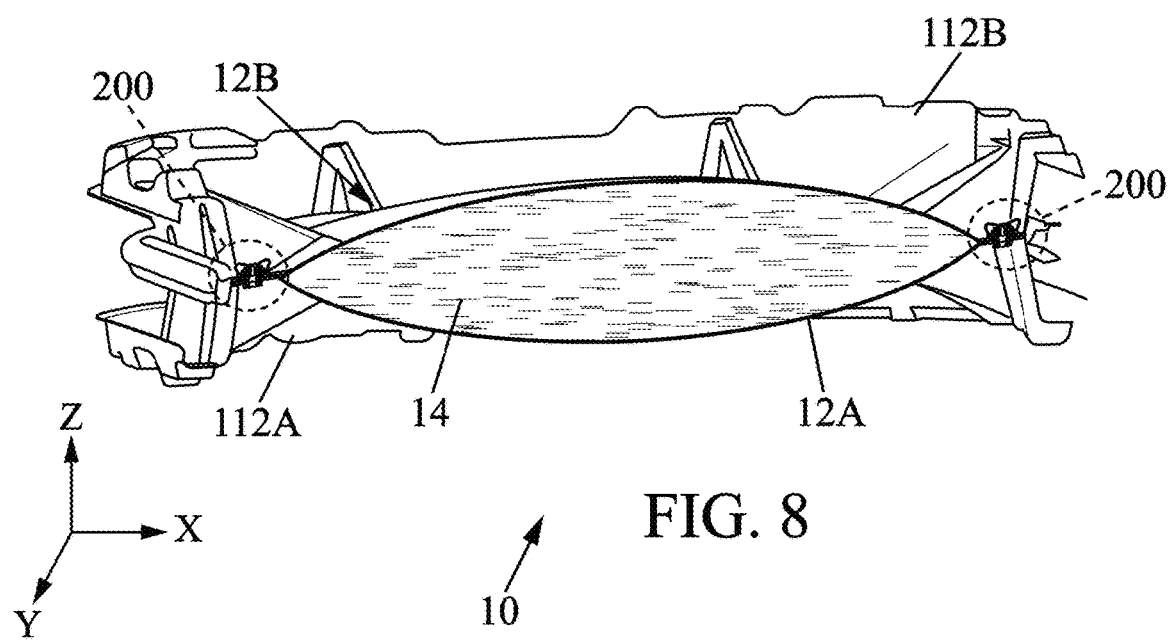
FIG. 8 shows a transversal view of a protecting system for containing a biopharmaceutical fluid which comprises a protecting body, a protecting package, a pouch filled with biopharmaceutical fluid and a fastening system according to one embodiment of the invention.
Figure 9:
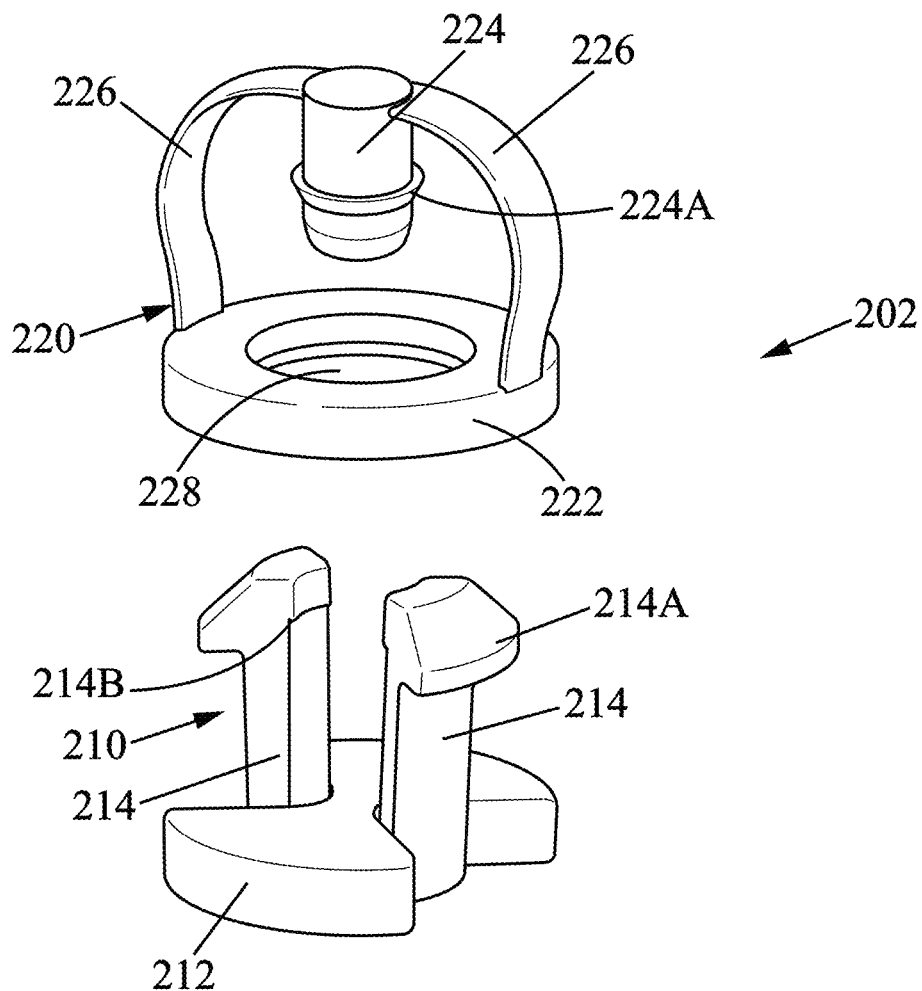
FIG. 9 shows an isometric view of an assembly of a fastening system according to one embodiment of the invention.

FIG. 8 illustrates an example of a protecting system 10, wherein the fastening system 200 clamps the two frames 112A, 112B of the protecting package 112 to the two plates 12A, 12B of the protecting body 12, which sandwich a pouch 14. In this embodiment, the pouch 14 is filled with biopharmaceutical fluid.

The fastening system 200 may be arranged in the through holes 28, 128 of the protecting body 12 and the protecting package 112. More precisely, the shaft parts 214 of the snap 210 can be inserted in the through holes 28, 228.

FIGS. 10 and 11 illustrates more precisely a fastening system 200 fastening the two frames 112A, 112B of the protecting package 112 to the two plates 12A, 12B of the protecting body 12.

FIG. 10 more particularly illustrates the engagement position, where the shaft parts 214 are inserted through the through holes 28, 128 of the protecting body 12 and the protecting package 112. The longitudinal axis of the snap 210 is perpendicular to the main plane XY. The backing part 212 is in regard with the lower frame 112A of the protecting package 112.

The longitudinal axis of the cap 220 is also perpendicular to the main plane XY. A surface of the cap 220 is in regard with the upper frame 112B of the protecting package 112, while an opposite surface of the washer 222 faces the captive locker 224.

As seen on FIG. 10, there is a gap between the washer 222 and the upper frame 112B in engagement position.

In the clamping position illustrated FIG. 11, the captive locker 224 is locked between the shaft parts 214 of the snap 210. In the clamping position, the two frames 112A, 112B are directly clamped against respectively the washer 222 of the cap 220 and the backing part 212 of the snap 210.

The captive locker 224 is locked between the shaft parts 214 of the snap 210 by means of the recess 214B and the protrusion portion 224A. The captive locker 224 puts off the shaft parts 214.

The extending portion 214A of the shaft parts 214 then pushes the washer 222 against the frame 112B to clamp the protecting body 12 and the protecting package 112 to each other. Then, there is no more gap between the washer 222 and the upper frame 112B, as in the engagement position. The insertion of the captive locker 224 between the shaft parts 214 prevents the slosh of the pouch sandwiched by the two plates 12A, 12B.

In clamping position, the protecting body 12 and the protecting package 112 are for example clamped to each other in a non-removable way.

The backing part 212 of the snap 210 and the washer 222 of the cap 220 are sized such that the backing part 212 and the washer 222 of the cap 220 creates a surface of retention between the assembly 202 of the fastening system 200 and the frames 112A, 112B.

The fastening system 200 may comprise a plurality of assemblies 202 described above. The assemblies 202 can be regularly arranged around the peripheral sides of the two frames 112A, 112B and the two plates 12A, 12B, in the through holes 28, 128.

The fastening system 200 is advantageous since the two plates 12A, 12B and the two frames 112A, 112B can be clamped to each other by only pressing the captive locker 224 of the cap 220 between the shaft parts 214 of the snap 210. It also reduces the time of assembling the system since the captive locker 224 of the cap 220 is ready to be inserted between the shaft parts 214 of the snap 210.

Moreover, the fastening system 200 only comprises two complementary pieces, which are the snap 210 and the cap 220, which reduces the number of component of an assembly 202 of the fastening system 200. It also reduces the cost of manufacturing such fastening system 200.

Alternatively, the upper and lower plates 12A, 12B of the protecting body 12 do not comprise through holes 28. This particular embodiment is illustrated on FIGS. 12 and 13.

The fastening system 200 is arranged in the through holes 128 of the upper and the lower frames 112A, 112B of the protecting package 112. The protecting body 12 and the protecting package 112 are thus sized such that the protecting body 12 can be clamped between the upper and lower frames 112A, 112B of the protecting package 112. Moreover, the peripheral sides of the two plates 12A, 12B of the protecting body may be arranged such that the fastening system 200 does not pass through any of the two plates 12A, 12B of the protecting body 12.

The protecting body 12 sandwiching the pouch 14 is also sandwiched by the upper and the lower frames 112A, 112B of the protecting package 112. In this particular embodiment, the upper and lower frames 112A, 112B of the protecting package 112 are sufficiently clamped to each other by the fastening system 200 to also clamp the upper and the lower plates 12A, 12B of the protecting body 12.

In the embodiments illustrated on FIGS. 8 to 13, the backing part 212 of the snap 210 is directly in contact with the lower frame 112A of the protecting package and the washer 222 of the cap 220 is directly in contact with the upper frame 112B, but it is understood that the backing part 212 could also be in contact with the upper frame 112B and that the washer 222 could be in contact with the lower frame 112A.

REFERENCES

System 10
Protecting body 12
Plates 12A, 12B
Clamp 11, 13
Flexible pouch 14
Front longitudinal edge 14A
Rear longitudinal edge 14B
Through hole 14C
Hose 16
Connector 17
Fastening system 18
Snap button 20
Assembly 22
Port 24
Through hole 28
Protecting package 112
Frames 112A, 112B
Longitudinal front side 113A
Longitudinal rear side 113B
Peripheral inner edge 114
Peripheral outer edge 116
Reinforcement body 118
Assembly 120
Complementary body 120A, 120B
Body 122
Recess 124

-continued

Protrusion 126
Through hole 128
Fastening system 200
Assembly 202
Snap 210
Backing part 212
Shaft part 214
Extending portion 214A
Recess 214B
Cap 220
Washer 222
Captive locker 224
Protrusion portion 224A
Belt 226
Opening 228

The invention claimed is:

1. A protecting system (10) for containing a biopharmaceutical fluid, comprising:
a flexible pouch (14) configured to contain a biopharmaceutical fluid;
a protecting package (112) with two frames (112A, 112B) which respectively form a lower frame and an upper frame and which have a peripheral area; and
a fastening system (200) configured to clamp the two frames (112A, 112B) of the protecting package (112) to each other, the frames (112A, 112B) sandwiching the flexible pouch (14),
wherein the fastening system (200) comprises an assembly (202) having only
a snap (210) comprising a backing part (212), and
a cap (220) comprising a washer (222),
wherein the lower and upper frames (112A, 112B) of the protecting package (112) are directly clamped between the washer (222) of the cap (220) and the backing part (212) of the snap (210) in a clamping position,
wherein the snap (210) further comprises at least two shaft parts (214) extending from the backing part (212) according to a longitudinal direction of the snap (210),
wherein the cap further comprises a captive locker (224), and
wherein the captive locker (224) is locked between the shaft parts (214) of the snap in the clamping position.

2. The protecting system (10) according to claim 1, wherein at least a peripheral side of the upper and lower frames (112A, 112B) of the protecting package (112) comprises through holes (128) facing each other, through which the fastening system (200) is arranged.

3. The protecting system (10) according to claim 2, wherein the snap (210) further comprises at least two shaft parts (214) extending from a backing part (212) according to a longitudinal direction of the snap (210), wherein the cap also comprises a captive locker (224), and wherein the captive locker (224) is locked between the shaft parts (214) of the snap in clamping position.

4. The protecting system (10) according to claim 2, further comprising:
a protecting body (12) including two plates (12A, 12B) which respectively form a lower surface and an upper surface, the two plates (12A, 12B) being configured to sandwich the flexible pouch (14) for constraining the flexible pouch (14), the two plates (12A, 12B) being clamped between the two frames (112A, 112B) of the protecting package (112) in clamping position.

5. The protecting system (10) according to claim 2, wherein the fastening system (200) is configured to pass from an engagement position,
wherein the shaft parts (214) are inserted in the washer (222), the upper and lower frames (112A, 112B) of the protecting package (112) being not clamped to each other, to a clamping position, and
wherein the captive locker (224) is locked between the shaft parts (214) such that the upper and the lower frames (112A, 112B) of the protecting package (112) are clamped to each other.

6. The protecting system (10) according to claim 1, further comprising:
a protecting body (12) including two plates (12A, 12B) which respectively form a lower surface and an upper surface, the two plates (12A, 12B) being configured to sandwich the flexible pouch (14) for constraining the flexible pouch (14), the two plates (12A, 12B) being clamped between the two frames (112A, 112B) of the protecting package (112) in clamping position.

7. The protecting system (10) according to claim 6, wherein at least a peripheral side of the lower and upper plates (12A, 12B) of the protecting body (12) comprises through holes (28) facing the through holes (128) of the protecting package (112), the fastening system (200) being arranged through the through holes (28, 128) of the protecting body (12) and the protecting package (112).

8. The protecting system (10) according to claim 7, wherein the shaft parts (214) of the snap (210) are configured to be inserted in the through holes (28, 128).

9. The protecting system (10) according to claim 6,
wherein the fastening system (200) is configured to pass from an engagement position,
wherein the shaft parts (214) are inserted in the washer (222), the upper and lower frames (112A, 112B) of the protecting package (112) being not clamped to each other, to a clamping position, and
wherein the captive locker (224) is locked between the shaft parts (214) such that the upper and the lower frames (112A, 112B) of the protecting package (112) are clamped to each other.

10. The protecting system (10) according to claim 1,
wherein the fastening system (200) is configured to pass from an engagement position,
wherein the shaft parts (214) are inserted in the washer (222), the upper and lower frames (112A, 112B) of the protecting package (112) being not clamped to each other, to a clamping position, and
wherein the captive locker (224) is locked between the shaft parts (214) such that the upper and the lower frames (112A, 112B) of the protecting package (112) are clamped to each other.

11. The protecting system (10) according to claim 1, wherein an inner surface of each shaft part (214) of the snap (210) comprises a recess (214B) able to retain a protrusion portion (224A) of the captive locker (224) in clamping position.

12. The protecting system (10) according to claim 1, wherein an end of the shaft parts (214) comprises an extending portion (214A), the extending portion (214A) being sized such that, after the insertion of the shaft parts (214) into the washer (222) of the cap, the shaft parts (214) are prevented from being removed from the washer (222) of the cap (220).

13. The protecting system (10) according to claim 12, wherein the captive locker (224) is sized such that, in clamping position, the captive locker (224) is able to push the shaft parts (214) of the snap (210) away from a longitudinal axis of the snap (210), such that the extending portions (214A) of the shaft parts (214) are able to maintain the washer (222) directly against one of the plates of the protecting body (12).

14. The protecting system (10) according to claim 1, wherein the shaft parts (214) of the snap (210) are made of a rigid elastic material.

15. The protecting system of claim 14, wherein the rigid elastic material is selected from the group consisting of: Acrylonitrile Butadiene Styrene, Polycarbonate, Polyvinylidene fluoride, Polysulfone, and Polyurethane.

16. The protecting system (10) according to claim 1, wherein the cap (220) also comprises two belts (226) connecting respectively an edge of the washer (222) to a top of the captive locker (224) and an opposite edge of the washer (222) to the top of the captive locker (224), the belts (226) being made of a flexible material.

17. The protecting system (10) according to claim 1, wherein a longitudinal axis of the snap (210) is substantially perpendicular to a main plane of the protecting package (112).

\* \* \* \* \*